(12) United States Patent
Zhao

(10) Patent No.: US 12,339,737 B2
(45) Date of Patent: Jun. 24, 2025

(54) MEMORY SYSTEM AND OPERATION METHOD THEREOF, AND COMPUTER-READABLE STORAGE MEDIUM

(71) Applicant: Yangtze Memory Technologies Co., Ltd., Hubei (CN)

(72) Inventor: Weiyi Zhao, Wuhan (CN)

(73) Assignee: Yangtze Memory Technologies Co., Ltd., Hubei (CN)

( * ) Notice: Subject to any disclaimer, the term of this patent is extended or adjusted under 35 U.S.C. 154(b) by 71 days.

(21) Appl. No.: 18/490,711

(22) Filed: Oct. 19, 2023

(65) Prior Publication Data
US 2024/0378109 A1    Nov. 14, 2024

Related U.S. Application Data

(63) Continuation of application No. PCT/CN2023/092831, filed on May 8, 2023.

(51) Int. Cl.
*G06F 11/00* (2006.01)
*G06F 11/07* (2006.01)

(52) U.S. Cl.
CPC ........ *G06F 11/0793* (2013.01); *G06F 11/073* (2013.01); *G06F 11/079* (2013.01)

(58) Field of Classification Search
CPC .. G06F 11/0793; G06F 11/073; G06F 11/079; G06F 11/0772
USPC .......................................... 714/1–57
See application file for complete search history.

(56) References Cited

U.S. PATENT DOCUMENTS

2016/0034331 A1*  2/2016  Na ...................... G06F 11/0727
                                                        714/54
2019/0026172 A1*  1/2019  Wu ..................... G06F 11/0787

* cited by examiner

*Primary Examiner* — Sarai E Butler
(74) *Attorney, Agent, or Firm* — Fish & Richardson P.C.

(57) ABSTRACT

Examples of the present disclosure provide a memory system and an operation method thereof, and a computer-readable storage medium. The memory system comprises a memory device; and a memory controller coupled to the memory device; wherein the memory controller being configured to: trigger an assertion in response to that an abnormality occurs in a firmware of the memory system; set a flag to abort a hardware sequence command in response to that release of the hardware sequence command is not completed within a preset time after the abnormality occurs in the firmware; and in response to the flag to abort the hardware sequence command, abort the hardware sequence command.

20 Claims, 7 Drawing Sheets

300

MEMORY SYSTEM AND OPERATION METHOD THEREOF, AND COMPUTER-READABLE STORAGE MEDIUM

CROSS-REFERENCE TO RELATED APPLICATIONS

This application is a continuation of International Application No. PCT/CN2023/092831, filed on May 8, 2023, the disclosure of which is hereby incorporated by reference in its entirety.

TECHNICAL FIELD

The present disclosure relates to, but is not limited to, a memory system and an operation method thereof, and a computer-readable storage medium.

BACKGROUND

With the rapid development of data storage technologies, more and more data memory systems, such as Solid State Drives (SSDs) and the like, are appearing in electronic devices used by people. SSDs have been widely used in military, automotive, industrial, medical and aviation fields because of its characteristics such as fast read and write speed, anti-vibration, low power consumption, no noise, low heat and light weight and the like.

SUMMARY

According to a first aspect of examples of the present disclosure, it is provided a memory system, comprising: a memory device; and a memory controller coupled to the memory device; wherein the memory controller being configured to: trigger an assertion when an abnormality occurs in a firmware of the memory system during operation; set a flag to abort a hardware sequence command when release of the hardware sequence command is not completed within a preset time after the abnormality occurs in the firmware; and in response to the flag to abort the hardware sequence command, abort the hardware sequence command such that the release of the hardware sequence command is completed.

In some examples, the memory controller is configured to:
not set the flag to abort the hardware sequence command when the release of the hardware sequence command is completed within the preset time.

In some examples, the preset time is longer than 2 s.

In some examples, the memory controller is configured to:
after the release of the hardware sequence command is completed, send a command to save abnormality context information into the memory device.

In some examples, the memory controller is configured to:
before sending the command to save the abnormality context information into the memory device, send a command to store the abnormality context information into a buffer of the memory controller; and
after the release of the hardware sequence command is completed, send a command to save the abnormality context information stored in the buffer of the memory controller into the memory device.

In some examples, the memory controller is configured to:
before sending the command to save the abnormality context information into the memory device, send a command to reset the memory device.

In some examples, the memory controller is configured to:
after the assertion is triggered, determine to trigger an assertion processing mode when it is determined that the abnormality does not belong to abnormality caused by execution of an error correction code operation.

In some examples, the memory controller is configured to:
after the assertion is triggered, determine to trigger an assertion processing mode when it is determined that the abnormality belongs to abnormality caused by execution of an error correction code operation and the abnormality caused by the execution of the error correction code operation occurs for the first time at a corresponding location of the memory device where the abnormality is caused to occur.

In some examples, the memory controller is configured to:
acquire abnormality context information of the corresponding location of the memory device where the abnormality is caused to occur that is saved in the memory device before the abnormality occurred; and
determine whether the abnormality caused by the execution of the error correction code operation occurs for the first time at the corresponding location of the memory device where the abnormality is caused to occur, based on the abnormality context information of the corresponding location of the memory device where the abnormality is caused to occur that is saved in the memory device before the abnormality occurred.

In some examples, the memory controller is configured to:
after determining to trigger the assertion processing mode, send a command to terminate running a program.

According to a second aspect of examples of the present disclosure, it is provided another memory system, comprising a memory device and a memory controller coupled to the memory device; wherein the memory controller being configured to:
trigger an assertion when an abnormality occurs in a firmware of the memory system during operation; and
determine not to trigger an assertion processing mode when the abnormality belongs to abnormality caused by execution of an error correction code operation and the abnormality caused by the execution of the error correction code operation does not occur for the first time at a corresponding location of the memory device where the abnormality is caused to occur.

In some examples, the memory controller is configured to:
acquire abnormality context information of the corresponding location of the memory device where the abnormality is caused to occur that is saved in the memory device before the abnormality occurred; and
determine whether the abnormality caused by the execution of the error correction code operation does not occur for the first time at the corresponding location of the memory device where the abnormality is caused to occur, based on the abnormality context information of the corresponding location of the memory device where the abnormality is caused to occur that is saved in the memory device before the abnormality occurred.

In some examples, the memory controller is configured to:
after determining not to trigger the assertion processing mode, send a command to save event log information into the memory device.

In some examples, the memory controller is configured to:
determine to trigger the assertion processing mode when the abnormality does not belong to the abnormality caused by the execution of the error correction code operation or when the abnormality belongs to the abnormality caused by the execution of the error correction code operation and the abnormality caused by the execution of the error correction code operation occurs for the first time at the corresponding location of the memory device where the abnormality is caused to occur.

In some examples, the memory controller is configured to:
after determining to trigger the assertion processing mode, send a command to terminate running a program.

According to a third aspect of examples of the present disclosure, it is provided an operation method of a memory system, the method comprising:
triggering an assertion when an abnormality occurs in a firmware of the memory system during operation;
setting a flag to abort a hardware sequence command when release of the hardware sequence command is not completed within a preset time after the abnormality occurs in the firmware; and
in response to the flag to abort the hardware sequence command, aborting the hardware sequence command such that the release of the hardware sequence command is completed.

In some examples, the method further comprises:
not setting the flag to abort the hardware sequence command when the release of the hardware sequence command is completed within the preset time.

In some examples, the preset time is longer than 2 s.

In some examples, the method further comprises:
after the release of the hardware sequence command is completed, sending a command to save abnormality context information into a memory device.

In some examples, the method further comprises:
before sending the command to save the abnormality context information into the memory device, sending a command to store the abnormality context information into a buffer of a memory controller; and
after the release of the hardware sequence command is completed, sending a command to save the abnormality context information stored in the buffer of the memory controller into the memory device.

In some examples, the method further comprises:
before sending the command to save the abnormality context information into the memory device, sending a command to reset the memory device.

In some examples, the method further comprises:
after the assertion is triggered, determining to trigger an assertion processing mode when it is determined that the abnormality does not belong to abnormality caused by execution of an error correction code operation.

In some examples, the method further comprises:
after the assertion is triggered, determining to trigger an assertion processing mode when it is determined that the abnormality belongs to abnormality caused by execution of an error correction code operation and the abnormality caused by the execution of the error correction code operation occurs for the first time at a corresponding location of a memory device where the abnormality is caused to occur.

In some examples, the method further comprises:
acquiring abnormality context information of the corresponding location of the memory device where the abnormality is caused to occur that is saved in the memory device before the abnormality occurred; and
determining whether the abnormality caused by the execution of the error correction code operation occurs for the first time at the corresponding location of the memory device where the abnormality is caused to occur, based on the abnormality context information of the corresponding location of the memory device where the abnormality is caused to occur that is saved in the memory device before the abnormality occurred.

In some examples, the method further comprises:
after determining to trigger the assertion processing mode, sending a command to terminate running a program.

According to a fourth aspect of examples of the present disclosure, it is provided another operation method of a memory system, the method comprising:
triggering an assertion when an abnormality occurs in a firmware of the memory system during operation; and
determining not to trigger an assertion processing mode when the abnormality belongs to abnormality caused by execution of an error correction code operation and the abnormality caused by the execution of the error correction code operation does not occur for the first time at a corresponding location of a memory device where the abnormality is caused to occur.

In some examples, the method further comprises:
acquiring abnormality context information of the corresponding location of the memory device where the abnormality is caused to occur that is saved in the memory device before the abnormality occurred; and
determining whether the abnormality caused by the execution of the error correction code operation does not occur for the first time at the corresponding location of the memory device where the abnormality is caused to occur, based on the abnormality context information of the corresponding location of the memory device where the abnormality is caused to occur that is saved in the memory device before the abnormality occurred.

In some examples, the method further comprises:
after determining not to trigger the assertion processing mode, sending a command to save event log information into the memory device.

In some examples, the method further comprises:
determining to trigger the assertion processing mode when the abnormality does not belong to the abnormality caused by the execution of the error correction code operation or when the abnormality belongs to the abnormality caused by the execution of the error correction code operation and the abnormality caused by the execution of the error correction code operation occurs for the first time at the corresponding location of the memory device where the abnormality is caused to occur.

In some examples, the method further comprises:
after determining to trigger the assertion processing mode, sending a command to terminate running a program.

According to a fifth aspect of examples of the present disclosure, it is provided computer-readable storage medium having stored therein a computer program that, when executed by a processor, cause the processor to perform the operation method according to any of various examples.

DETAILED DESCRIPTION

Figure 1:
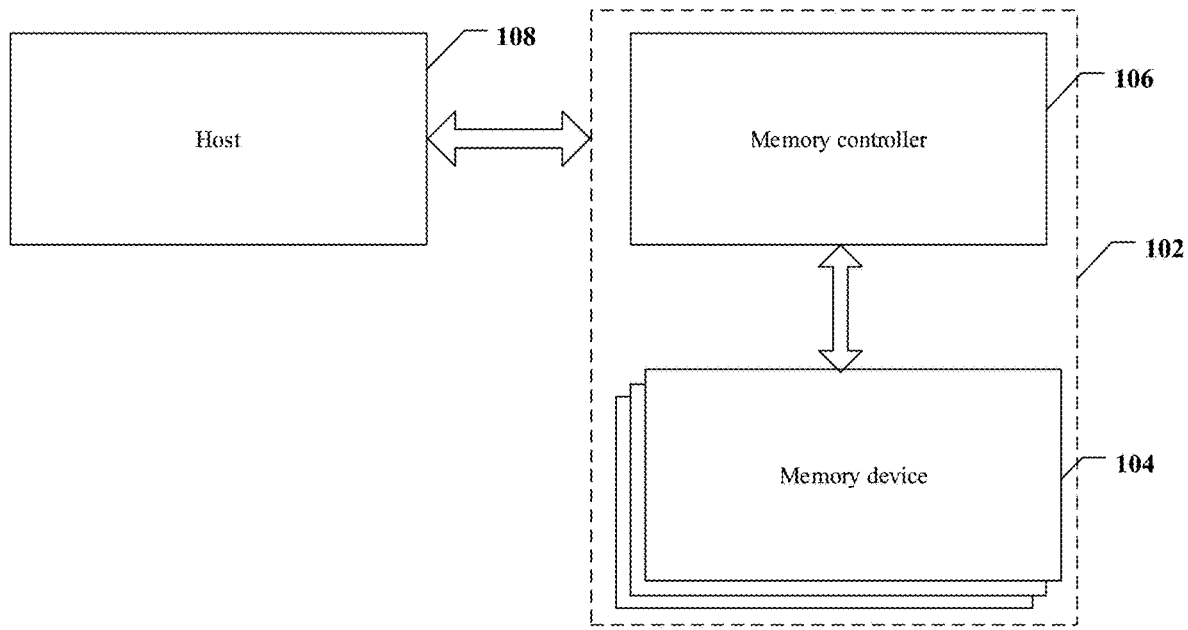
FIG. 1 is a schematic diagram of an example system with a memory system according to an example of the present disclosure.

Examples of the present disclosure will be described in more detail below with reference to the accompanying drawings. Although examples of the present disclosure are shown in the drawings, it should be understood that the present disclosure may be implemented in various ways and should not be limited to the DETAILED DESCRIPTION set forth herein. Rather, these examples are provided so that the present disclosure can be more thoroughly understood and the scope of the present disclosure can be fully conveyed to those skilled in the art.

In the following description, numerous specific details are given in order to provide a more thorough understanding of the present disclosure. It will be apparent, however, to one skilled in the art that the present disclosure may be practiced without one or more of these details. In other examples, some technical features well-known in the art are not described to avoid confusion with the present disclosure; that is, not all features of the actual example are described here, and well-known functions and structures are not described in detail.

In the drawings, the size of layers, regions, elements and their relative sizes may be exaggerated for clarity. Like reference numerals refer to like elements throughout.

It will be understood that when an element or layer is referred to as being "on," "adjacent to." "connected to" or "coupled to" another element or layer, it can be directly on, adjacent to, connected to, or coupled to other elements or layers, or intervening elements or layers may be present. In contrast, when an element is referred to as being "directly on." "directly adjacent to," "directly connected to" or "directly coupled to" another element or layer, there are no intervening elements or layers. It will be understood that, although the terms such as first, second, third etc. may be used to describe at least one of various elements, components, regions, layers or sections, at least one of these elements, components, regions, layers or sections should not be limited by these terms. These terms are only used to distinguish one element, component, region, layer or section from another element, component, region, layer or section. Thus, a first element, component, region, layer or section discussed below could be represented as a second element, component, region, layer or section without departing from the teachings of the present disclosure. When a second element, component, region, layer or section is discussed, it does not indicate that a first element, component, region, layer or section necessarily exists in the present disclosure.

Spatial terms such as "under", "below", "beneath", "underneath", "on", "above" and so on, can be used here for convenience to describe the relationship between one element or feature and other elements or features shown in the figures. It will be understood that the spatially relationship terms also comprise different orientations of the device in use and operation in addition to the orientation depicted in the figures. For example, if the device in the figures is turned over, elements or features described as "below" or "underneath" or "under" other elements or features would then be oriented as "above" the other elements or features. Thus, the example terms "below" and "under" can comprise both orientations of above and below. The device may be otherwise oriented (rotated 90 degrees or at other orientations) and the spatial descriptors used herein may be interpreted accordingly.

The terminology used herein is for the purpose of describing particular examples only and is not to be taken as a limitation of the present disclosure. As used herein, "a", "an" and "said/the" in singular forms are intended to include the plural forms as well, unless the context clearly dictates otherwise. It should be also understood that at least one of the terms "consists of" or "comprising", when used in this specification, identify the presence of at least one of stated features, integers, operations, elements or components, but do not exclude presence or addition of at least one of one or more other features, integers, operations, elements, components or groups. As used herein, the term "at least one of . . . or . . . " includes any and all combinations of the associated listed items.

For case of understanding the characteristics and technical content of the examples of the present disclosure in more detail, the examples of the present disclosure will be described in detail below in conjunction with the accompanying drawings. The attached drawings are only for reference and description, and are not intended to limit the examples of the present disclosure.

FIG. 1 illustrates a block diagram of an example system 100 having memory, according to some aspects of the present disclosure. System 100 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having storage therein. As shown in FIG. 1, system 100 can include a host 108 and a memory system 102 having one or more memory device 104 and a memory controller 106. Host 108 can be a processor of an electronic device, such as a central processing unit (CPU), or a system-on-chip (SoC), such as an application processor (AP). Host 108 can be configured to send or receive data to or from memory device 104.

Memory controller 106 is coupled to memory device 104 and host 108 and is configured to control memory device 104, according to some examples. Memory controller 106 can manage the data stored in memory device 104 and communicate with host 108. In some examples, memory controller 106 is designed for operating in a low duty-cycle environment like secure digital cards, compact Flash cards, universal serial bus Flash drives, or other media for use in electronic devices, such as personal computers, digital cameras, mobile phones, etc. In some examples, memory controller 106 is designed for operating in a high duty-cycle environment SSD or embedded multi-media-cards used as data storage for mobile devices, such as smartphones, tablets, laptop computers, etc., and enterprise storage arrays.

Memory controller 106 can be configured to control operations of memory device 104, such as read, erase, and program operations. Memory controller 106 can also be configured to manage various functions with respect to the data stored or to be stored in memory device 104 including, but not limited to bad-block management, garbage collection, logical-to-physical address conversion, wear leveling, etc. In some examples, memory controller 106 is further configured to process error correction codes with respect to the data read from or written to memory device 104. Any other suitable functions may be performed by memory controller 106 as well, for example, formatting memory device 104. Memory controller 106 can communicate with an external device (e.g., host 108) according to a particular communication protocol. For example, memory controller 106 may communicate with the external device through at least one of various interface protocols, such as a USB protocol, an MMC protocol, a peripheral component interconnection protocol, a peripheral component interconnection express protocol, an advanced technology attachment protocol, a serial advanced technology attachment protocol, a parallel advanced technology attachment protocol, a small computer small interface protocol, an enhanced small disk interface protocol, an integrated drive electronics protocol, a firmware protocol, etc.

Figure 2A:
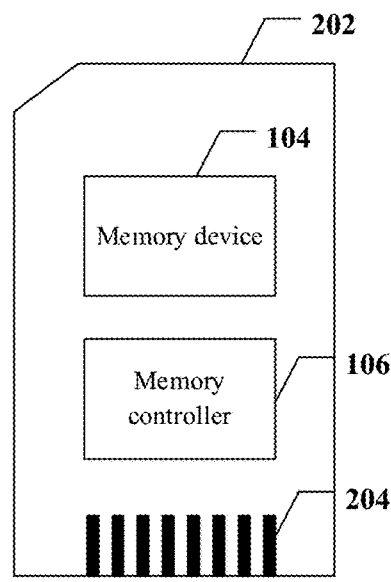
FIG. 2a is a schematic diagram of an example memory card with a memory system according to an example of the present disclosure.
Figure 2B:
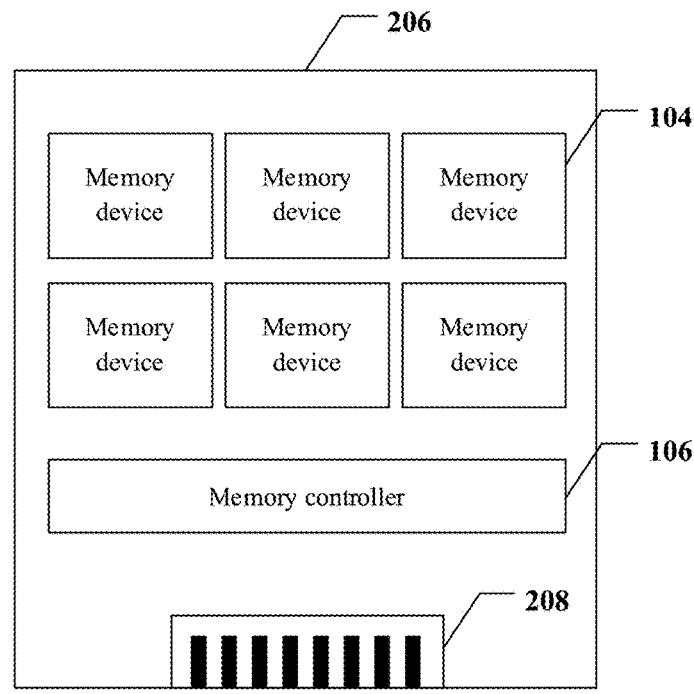
FIG. 2b is a schematic diagram of an example solid state drive with a memory system according to an example of the present disclosure.

Memory controller 106 and one or more memory devices 104 can be integrated into various types of storage devices, for example, be included in the same package, such as a universal Flash storage (UFS) package or an eMMC package. That is, memory system 102 can be implemented and packaged into different types of end electronic products. In one example as shown in FIG. 2a, memory controller 106 and a single memory device 104 may be integrated into a memory card 202. Memory card 202 can include a compact Flash card, a smart media card, a memory stick, a multimedia card, a secure digital card, a UFS, etc. Memory card 202 can further include a memory card connector 204 coupling memory card 202 with a host (e.g., host 108 in FIG. 1). In another example as shown in FIG. 2b, memory controller 106 and multiple memory devices 104 may be integrated into an SSD 206. SSD 206 can further include an SSD connector 208 coupling SSD 206 with a host (e.g., host 108 in FIG. 1). In some examples, at least one of the storage capacity or the operation speed of SSD 206 is greater than those of memory card 202.

Figure 3A:
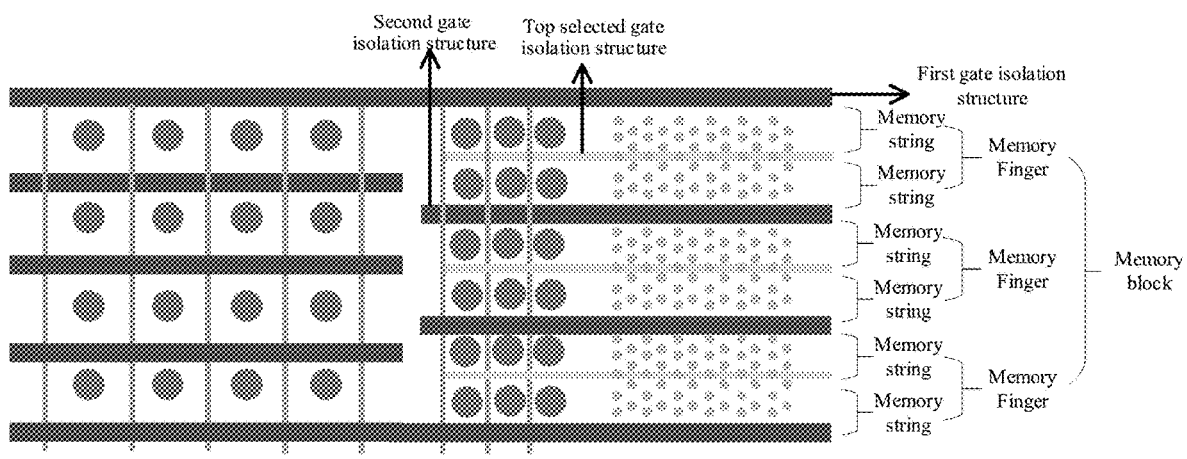
FIG. 3a is a schematic diagram of the distribution of memory cells of a three-dimensional NAND type memory according to an example of the present disclosure.

FIG. 3a provides a structural schematic diagram of a memory array of a three-dimensional NAND type memory. As shown in FIG. 3a, the memory array of a three-dimensional NAND type memory consists of several memory cell rows parallel to gate isolation structure and staggered in parallel. Every four rows of the memory cell rows are separated by a gate isolation structure and a top selected gate isolation structure, and each memory cell row includes a plurality of memory cells. The gate isolation structure may include a first gate isolation structure and a second gate isolation structure. The first gate isolation structure divides the memory array into a plurality of memory blocks, the plurality of second gate isolation structures can divide the memory block into multiple memory fingers, and the top selected gate isolation structure provided in the middle of each memory finger can divide the memory finger into two parts, so that the memory finger is divided into two memory strings. A memory block shown in FIG. 3a contains 6 memory strings, and in practical applications, the number of memory strings in a memory block is not limited to this. The memory cells coupled to a certain word line in a memory block may be referred to as a memory page, which is a physical page here.

It should be noted that the number of memory cell rows between the gate isolation structure and the top selected gate isolation structure shown in FIG. 3a is merely an example, and is not used for limiting the number of memory cell rows contained in one memory finger of the three-dimensional NAND type memory in the present disclosure. In practical applications, the number of memory cell rows contained in one memory finger can be adjusted according to actual conditions, such as 2, 4, 8, 16, and so on.

Figure 3B:
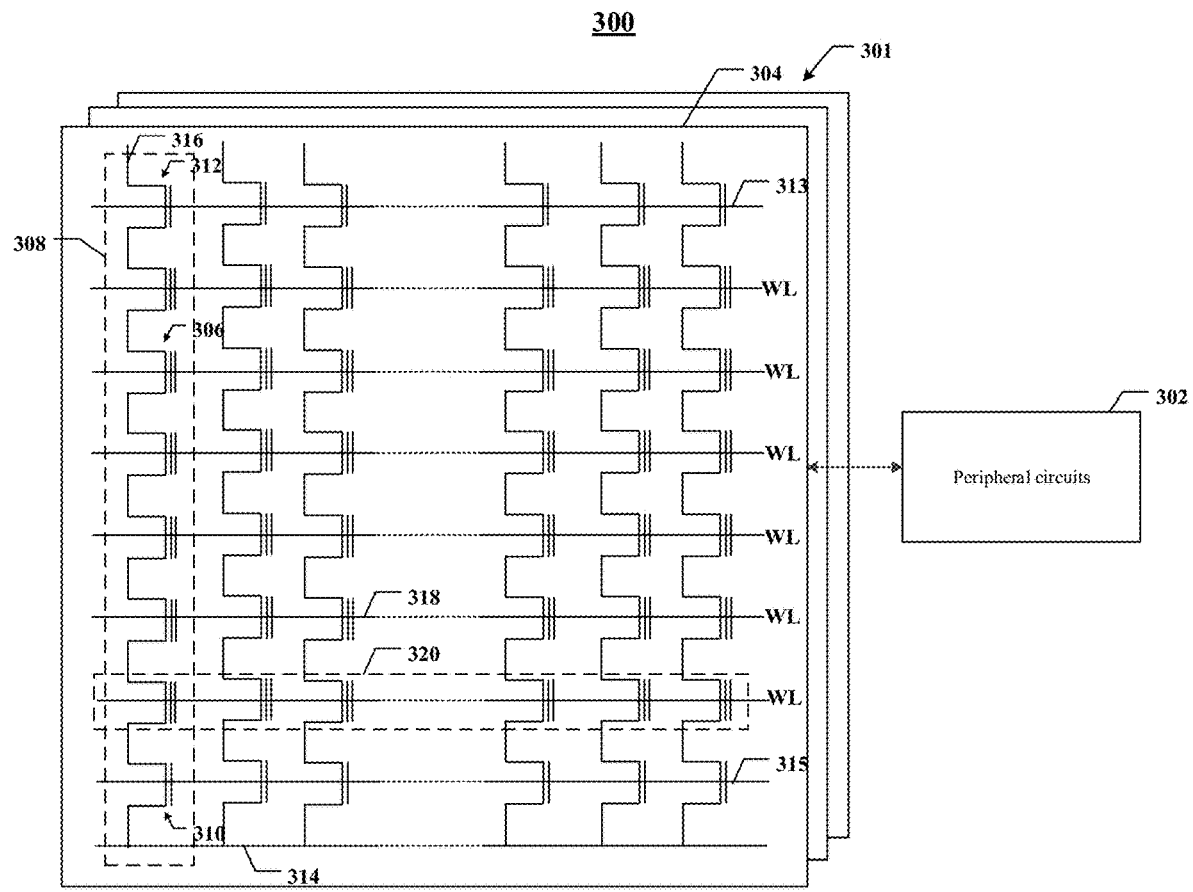
FIG. 3b is a schematic diagram of an example memory device including peripheral circuits according to an example of the present disclosure.

FIG. 3b illustrates a schematic circuit diagram of an example memory device 300 including peripheral circuits, according to some aspects of the present disclosure. The memory device 300 can be an example of the memory device 104 in FIG. 1. The memory device 300 can include a memory array 301 and peripheral circuits 302 coupled to memory array 301. The memory array 301 is illustrated as an example of a three-dimensional NAND type memory array, in which memory cells 306 are NAND memory cells and are provided in the form of an array of memory strings 308 each extending vertically above a substrate (not shown). In some examples, each memory string 308 includes a plurality of memory cells 306 coupled in series and stacked vertically. Each memory cell 306 can hold a continuous, analog value, such as an electrical voltage or charge, that depends on the number of electrons trapped within a region of memory cell 306. Each memory cell 306 can be either a floating gate type of memory cell including a floating-gate transistor or a charge trap type of memory cell including a charge-trap transistor.

In some examples, each memory cell 306 is a single-level cell (SLC) that has two possible memory states and thus, can store one bit of data. For example, the first memory state "0" can correspond to a first range of voltages, and the second memory state "1" can correspond to a second range of voltages. In some examples, each memory cell 306 is a multi-level cell (MLC) that is capable of storing more than single bit of data in more than four memory states. For example, the MLC can store two bits per cell, three bits per cell (also known as trinary-level cell (TLC)), or four bits per cell (also known as a quad-level cell (QLC)). Each MLC can be programmed to assume a range of possible nominal storage values. In one example, if each MLC stores two bits of data, then the MLC can be programmed to assume one of three possible programming levels from an erased state by writing one of three possible nominal storage values to the cell, and a fourth nominal storage value can be used for the erased state.

As shown in FIG. 3b, each memory string 308 can include a bottom selected transistor (BST) 310 at its source end and a top selected transistor (TST) 312 at its drain end. BST 310 and TST 312 can be configured to activate selected memory strings 308 during read and program operations. In some examples, the sources of memory strings 308 in a same memory block 304 are coupled through a same source line (SL) 314, e.g., a common SL. In other words, all memory strings 308 in the same memory block 304 have an array common source (ACS), according to some examples. TST 312 of each memory string 308 is coupled to a respective bit line (BL) 316 from which data can be read or written via an output bus (not shown), according to some examples. In some examples, each memory string 308 is configured to be selected or deselected by at least one of applying a select voltage (e.g., above the threshold voltage of the transistor having TST 312) or a deselect voltage (e.g., 0 V) to respective TST 312 through one or more top selected lines (TSL) 313 or applying a select voltage (e.g., above the threshold voltage of the transistor having BST 310) or a deselect voltage (e.g., 0 V) to respective BST 310 through one or more bottom selected line (BSL) 315.

As shown in FIG. 3b, memory strings 308 can be organized into multiple memory blocks 304, each of which can have a common source line 314, e.g., coupled to the ground. In some examples, each memory block 304 is the basic data unit for erase operations, i.e., all memory cells 306 on the same memory block 304 are erased at the same time. To erase memory cells 306 in a selected memory block 304, source lines 314 coupled to selected memory block as well as unselected memory blocks in the same plane as selected memory block can be biased with an erase voltage (Vers), such as a high positive voltage (e.g., 20 V or more). It is understood that in some examples, erase operation may be performed at a half-memory block level, a quarter-memory block level, or a level having any suitable number of memory blocks or any suitable fractions of a memory block. Memory cells 306 of adjacent memory strings 308 can be coupled through word lines 318 that select which row of memory cells 306 is affected by read and program operations. In some examples, each word line 318 is coupled to a page 320 of memory cells 306, and the page 320 is the basic data unit for program operations. The size of one page 320 in bits can relate to the number of memory strings 308 coupled by word line 318 in one memory block 304. Each word line 318 can include a plurality of control gates (gate electrodes) at each memory cell 306 in respective page 320 and a gate line coupling the control gates. In combination with FIG. 3a above, one page 320 includes a plurality of memory cells 306, and the plurality of memory cells are isolated by the top selected gate isolation structure and the gate isolation structure. The multiple memory cells between the top selected gate isolation structure and the gate isolation structure are arranged into multiple memory cell rows, and each memory cell row is parallel to the gate isolation structure and the top selected gate isolation structure. Memory cells in memory strings that share a same word line form a programmable (read/write) page.

Figure 4:
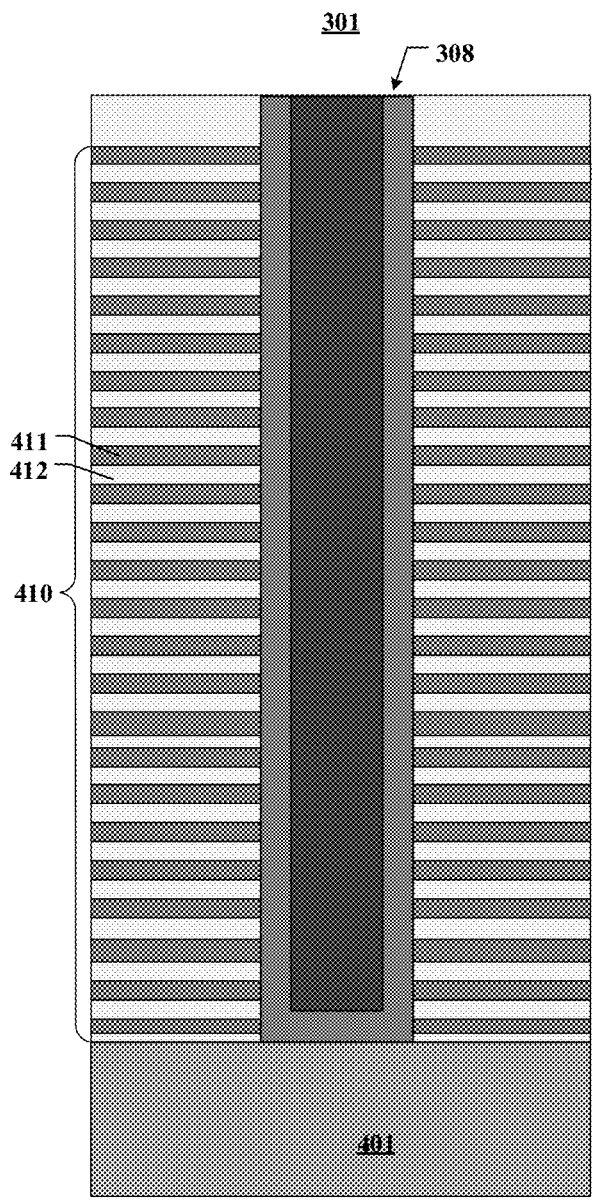
FIG. 4 is a schematic cross-sectional view of a memory array including memory strings according to an example of the present disclosure.

FIG. 4 shows a schematic cross-sectional view of an example memory array 301 including memory strings 308 in accordance with aspects of the present disclosure. As shown in FIG. 4, the memory string 308 may include a stacked structure 410, which includes a plurality of gate layers 411 and a plurality of insulating layers 412 alternately stacked in sequence, and a memory string 308 vertically penetrating through the gate layers 411 and the insulating layers 412. The gate layer 411 and the insulating layer 412 can be stacked alternately, and two adjacent gate layers 411 are separated by an insulating layer 412. The number of memory cells included in the memory array 301 is mainly related to the number of pairs of gate layers 411 and insulating layers 412 in the stacked structure 410.

The constituent material of the gate layer 411 may include a conductive material. The conductive material may include but is not limited to tungsten (W), cobalt (Co), Copper (Cu), aluminum (Al), polysilicon, doped silicon, silicide, or any combination thereof. In some examples, each gate layer 411 includes a metal layer, e.g., a tungsten layer. In some examples, each gate layer 411 includes a doped polysilicon layer. Each gate layer 411 may include a control gate surrounding the memory cell. The gate layer 411 at the top of the stacked structure 410 may extend laterally as a top selected gate line, the gate layer 411 at the bottom of the stacked structure 410 may extend laterally as a bottom selected gate line, and the gate layer 411 extending laterally between the top selected gate line and the bottom selected gate line may be used as a word line layer.

In some examples, the stacked structure 410 may be disposed on a substrate 401. The substrate 401 may include silicon (e.g., monocrystalline silicon), silicon germanium (SiGe), gallium arsenide (GaAs), germanium (Ge), silicon-on-insulator (SOI), germanium-on-insulator (GOI), or any other suitable material.

In some examples, memory string 308 includes a channel structure extending vertically through the stacked structure 410. In some examples, the channel structure includes a channel hole filled with semiconductor material(s) (e.g., as a semiconductor channel) and dielectric material(s) (e.g., as a memory film). In some examples, the semiconductor channel includes silicon, e.g., polysilicon. In some examples, the memory film is a composite dielectric layer including a tunneling layer, a storage layer (also referred to as a "charge trap/storage layer"), and a blocking layer. The channel structure may have a cylindrical shape (e.g., a pillar shape). According to some examples, the semiconductor channel, the tunneling layer, the storage layer and the blocking layer are radially arranged in this order from the center of the pillar toward the outer surface of the pillar. The tunneling layer may include silicon oxide, silicon oxynitride, or any combination thereof. The storage layer may include silicon nitride, silicon oxynitride, or any combination thereof. The blocking layer may include silicon oxide, silicon oxynitride, a high dielectric constant (high-k) dielectric, or any combination thereof. In one example, the memory film may include a composite layer of silicon oxide/silicon oxynitride/silicon oxide (ONO).

Figure 5:
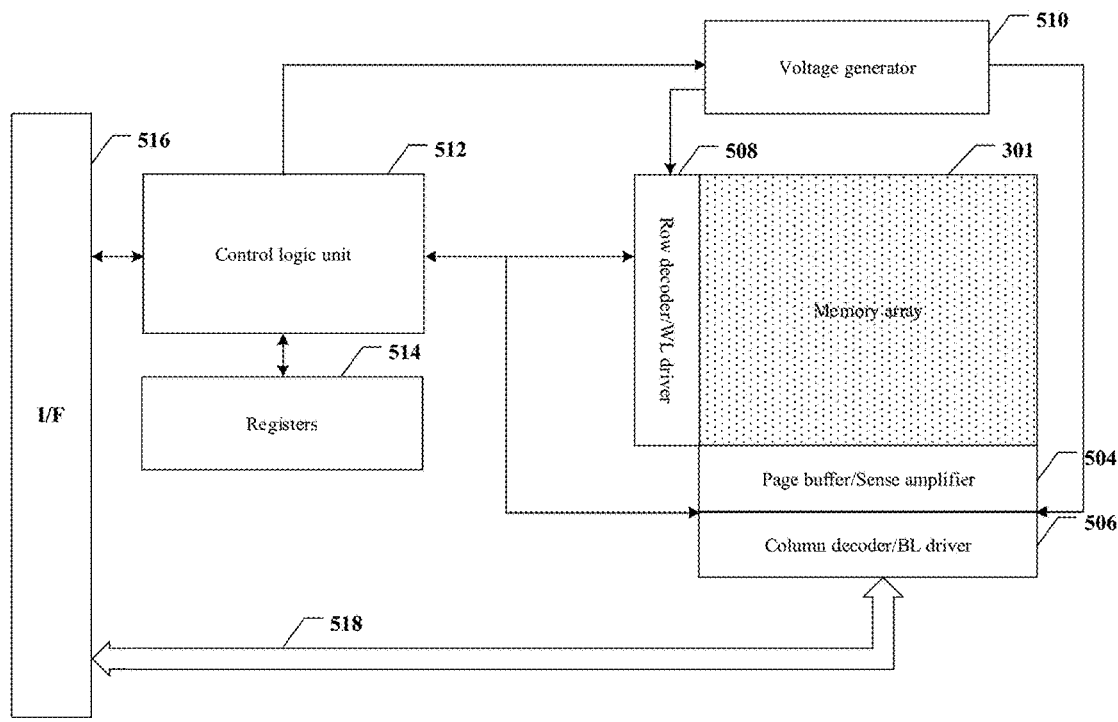
FIG. 5 is a schematic diagram of example memory including a memory array and peripheral circuits according to an example of the present disclosure.

Referring back to FIG. 3b, peripheral circuits 302 can be coupled to memory array 301 through bit lines 316, word lines 318, source lines 314, BSL 315, and TSL 313. Peripheral circuits 302 can include any suitable analog, digital, and mixed-signal circuits for facilitating the operations of memory array 301 by applying and sensing at least one of voltage signals or current signals to and from each target memory cell 306 through bit lines 316, word lines 318, source lines 314, BSL 315, and TSL 313. Peripheral circuits 302 can include various types of peripheral circuits formed using metal-oxide-semiconductor technologies. For example, FIG. 5 illustrates some example peripheral circuits, the peripheral circuits 302 including a page buffer/sense amplifier 504, a column decoder/bit line driver 506, a row decoder/word line driver 508, a voltage generator 510, control logic unit 512, registers 514, an interface 516, and a data bus 518. It is understood that in some examples, additional peripheral circuits not shown in FIG. 5 may be included as well.

Page buffer/sense amplifier 504 can be configured to read and program (write) data from and to memory array 301 according to the control signals from control logic unit 512. In one example, page buffer/sense amplifier 504 may store one page of program data (write data) to be programmed into one page 320 of memory array 301. In another example, page buffer/sense amplifier 504 may perform program verify operations to ensure that the data has been properly programmed into memory cells 306 coupled to selected word lines 318. In still another example, page buffer/sense amplifier 504 may also sense the low power signals from bit line 316 that represents a data bit stored in memory cell 306 and amplify the small voltage swing to recognizable logic levels in a read operation. Column decoder/bit line driver 506 can be configured to be controlled by control logic unit 512 and select one or more memory strings 308 by applying bit line voltages generated from voltage generator 510.

Row decoder/word line driver 508 can be configured to be controlled by control logic unit 512 and select/deselect blocks 304 of memory array 301 and select/deselect word lines 318 of block 304. Row decoder/word line driver 508 can be further configured to drive word lines 318 using word line voltages generated from voltage generator 510. In some examples, row decoder/word line driver 508 can also select/deselect and drive BSL 315 and TSL 313 as well. As described below in detail, row decoder/word line driver 508 is configured to perform program operations on the memory cells 306 coupled to the selected word line(s) 318. Voltage generator 510 can be configured to be controlled by control logic unit 512 and generate the word line voltages (e.g., read voltage, program voltage, pass voltage, local voltage, verification voltage, etc.), bit line voltages, and source line voltages to be supplied to memory array 301.

Control logic unit 512 can be coupled to each peripheral circuit described above and configured to control operations of each peripheral circuit. Registers 514 can be coupled to control logic unit 512 and include status registers, command registers, and address registers for storing status information, command operation codes (OP codes), and command addresses for controlling the operations of each peripheral circuit. Interface 516 may be coupled to control logic unit 512 and act as a control buffer to buffer and relay control commands received from a host (not shown) to control logic unit 512, and to buffer and relay status information received from control logic unit 512 to the host. Interface 516 may further be coupled to column decoder/bit line driver 506 via data bus 518 and act as a data I/O interface and data buffer to buffer and relay data to or from memory array 301.

Operations of the memory system (e.g., data writing operations, data reading operations, data erasing operations, etc.) can be implemented by running firmware stored in the memory system.

The memory device in the examples of the present disclosure includes but is not limited to a three-dimensional NAND type memory, and for case of understanding, a three-dimensional NAND type memory is used as an example for illustration.

Firmware bug problems will inevitably occur during firmware running, and the traditional way of handling them directly triggers an assertion, which in turn directly triggers an assertion processing mode to terminate running a program and save abnormality context information. With the increasing requirements for three-dimensional NAND type memory, how to ensure that the abnormality context information is successfully saved after the abnormality occurs in the firmware and how to improve the efficiency of user testing become urgent problems to be solved.

Figure 6:
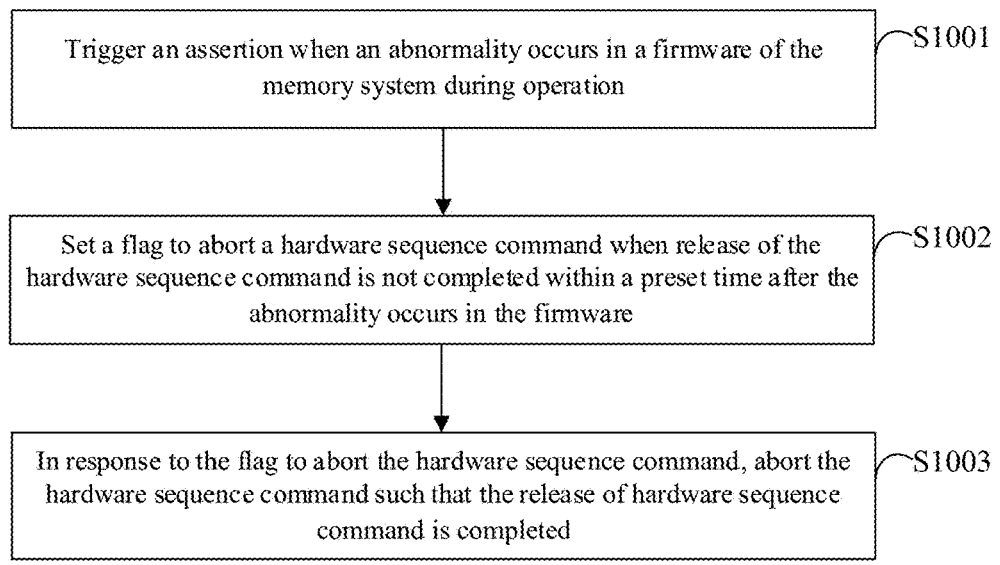
FIG. 6 is a schematic flowchart for implementing an operation method of a memory system according to an example of the present disclosure.

Based on one or more of the above problems, an example of the present disclosure provides an operation method of a memory system, and as shown in FIG. 6, the method comprises:

Operation S1001: triggering an assertion when an abnormality occurs in a firmware of the memory system during operation;

Operation S1002: setting a flag to abort a hardware sequence command when release of the hardware sequence command is not completed within a preset time after the abnormality occurs in the firmware; and Operation S1003: in response to the flag to abort the hardware sequence command, aborting the hardware sequence command such that the release of the hardware sequence command is completed.

The operation method of the memory system will be described in detail below with reference to FIGS. 6 and 7.

Herein, the firmware refers to a program written into an erasable programmable read-only memory or electrically erasable programmable read-only memory, that is, a device "driver" saved internally in the memory system. An operation system is enabled to implement specific running actions according to the standard device drive only by means of the firmware. The firmware is a software responsible for the most underlying and bottom-level tasks of a system.

In some examples, the firmware is stored in a read-only memory or a memory device in a memory controller of the memory system.

Abnormalities will inevitably occur during the running of the firmware. The occurrence of abnormalities during the running of the firmware will trigger an assertion, and then trigger an assertion processing mode under certain conditions, so as to save the abnormality context information. Abnormality context information may include coredump information such as PC pointers, stack usage information, and registers and the like. By saving the abnormality context information, the bug context can be saved to provide data support for subsequent system recovery.

When an abnormality occurs in the firmware, a hardware sequence command may be being executed or about to be executed. The hardware sequence command can be understood as a command specifying the execution order of each of the read, write, and erase commands. When an abnormality occurs during the running of the firmware, the current task needs to be cleared and the hardware sequence command needs to be released to save the abnormality context information. However, if the hardware sequence command cannot be released, the firmware will be stuck in a while loop, resulting in failure to save the abnormality context information.

With respect to the specific way to complete the release of the hardware sequence command, the examples of the present disclosure propose different examples depending on different situations.

In some examples, in the case that the assertion processing mode is triggered, a flag to abort the hardware sequence command is set when the release of the hardware sequence command is not completed within a preset time after the abnormality occurs in the firmware.

It is understood that the abnormality context information can only be saved after the release of the hardware sequence command is completed. When the release of the hardware sequence command is not completed within the preset time, it indicates that the firmware is stuck in the while loop and cannot be released automatically. According to the examples of the present disclosure, by setting the flag to abort the hardware sequence command, the forced release of the hardware sequence command is implemented in response to the flag to abort the hardware sequence command in the subsequent process, so as to avoid the problem of failure to save the abnormality context information caused by the failure in automatic release of the hardware sequence command.

In some examples, the method further comprises:
not setting the flag to abort the hardware sequence command when the release of the hardware sequence command is completed within the preset time.

It is understood that the hardware sequence command can also be released automatically. The time required for the hardware sequence command to complete the automatic release is short. When the release of the hardware sequence command is completed within the preset time, it indicates that the firmware is not stuck in the while loop, and the automatic release of the hardware sequence command has been completed. As a result, there is no need to additionally set a flag to abort the hardware sequence command to implement the forced release of the hardware sequence command.

In some examples, the preset time is longer than 2 s.

It is noted that, the range of the preset time provided in the foregoing examples is only an example. It is not intended to limit the range of the preset time in the examples of the present disclosure. In practical applications, the range of the preset time can be set according to the normal automatic release time of the hardware sequence command.

Figure 7:
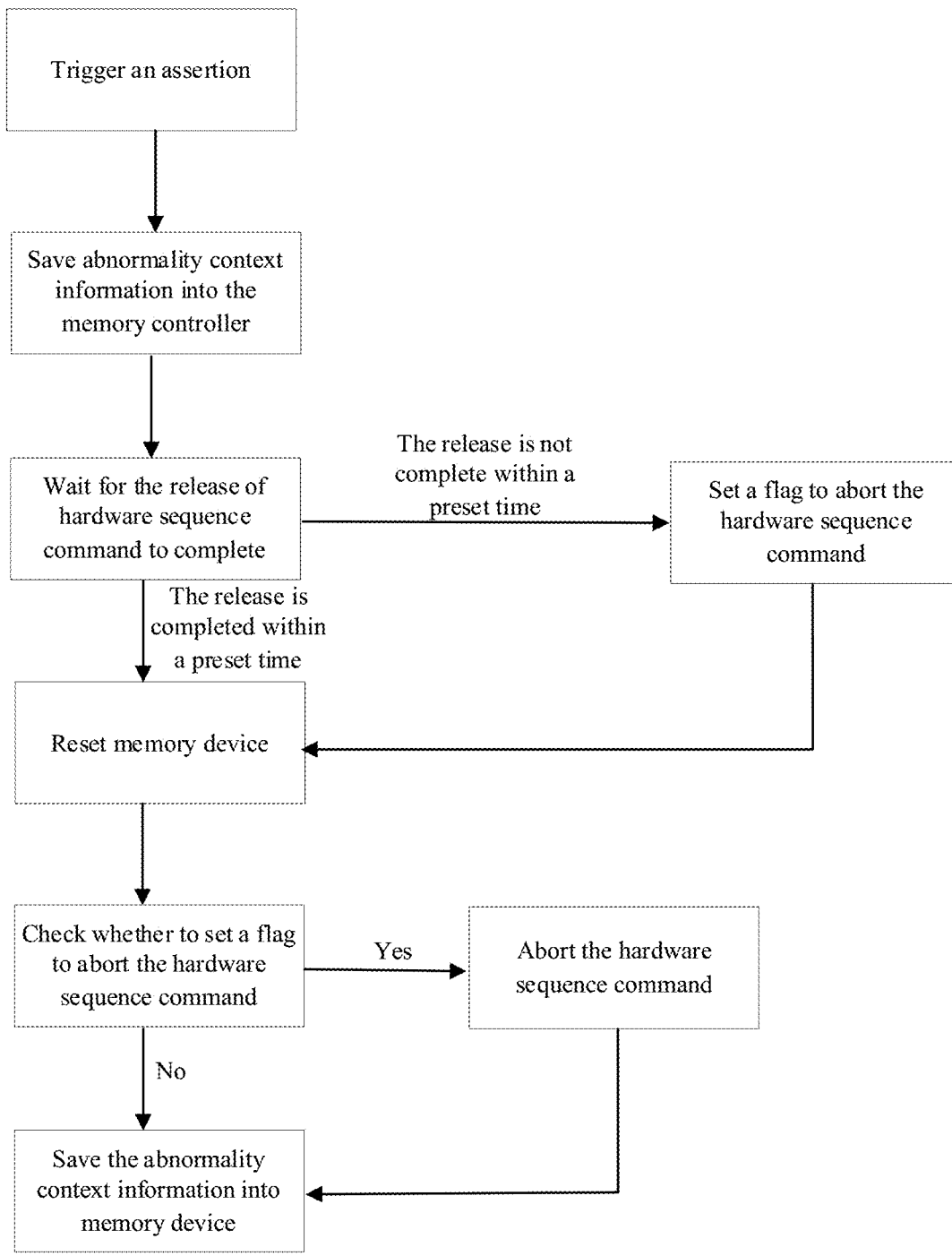
FIG. 7 is a schematic flowchart of a framework of an operation method of a memory system according to an example of the present disclosure.

In some examples, as shown in FIG. 7, it can be checked whether the flag to abort the hardware sequence command is set, and if the flag to abort the hardware sequence command is set, the hardware sequence command is directly forcibly aborted, so that the forced release of hardware sequence command is completed.

In some examples, the method further comprises:
after the release of the hardware sequence command is completed, sending a command to save abnormality context information into the memory device.

In some examples, the method further comprises:
before sending the command to save the abnormality context information into the memory device, sending a command to store the abnormality context information into a buffer of a memory controller; and
after the release of the hardware sequence command is completed, sending a command to save the abnormality context information stored in the buffer of the memory controller into the memory device.

Here, when an abnormality occurs during firmware operation, an assertion will be triggered. After the assertion is triggered, the abnormality context information will be cached in the buffer of the memory controller. After the release of hardware sequence command is completed, the abnormality context information saved in the memory controller is dumped into a memory block in the memory device.

In some examples, as shown in FIG. 7, the method further comprises:
before sending the command to save the abnormality context information into the memory device, sending a command to reset the memory device.

It is understood that when sending the command to save the abnormality context information into the memory device, the memory device may still be executing other commands, resulting in the inability to execute the command to save the abnormality context information. Therefore, the memory device needs to be reset before sending the command to save the abnormality context information into the memory device, so that the abnormality context information can be saved.

The occurrence of an abnormality during running of the firmware will trigger an assertion. The abnormal situation of the firmware may be further determined from the assertion to determine whether the abnormal situation meets certain set conditions. If some set conditions are not met, the assertion processing mode will not be triggered. The program proceeds without saving the context problematic information. The assertion processing mode will be triggered only when certain set conditions are met. In the assertion processing mode, the program will be aborted and the abnormality context information will be saved.

In some examples, the method further comprises:
after the assertion is triggered, determining to trigger an assertion processing mode when it is determined that the abnormality does not belong to abnormality caused by execution of an error correction code operation.

In some examples, the method further comprises:
after the assertion is triggered, determining to trigger an assertion processing mode when it is determined that the abnormality belongs to abnormality caused by execution of an error correction code operation and the abnormality caused by the execution of the error correction code operation occurs for the first time at a corresponding location of a memory device where the abnormality is caused to occur.

It is understood that the abnormalities occurring during firmware operation include a variety of situations. When some special abnormalities such as the abnormalities that are caused by the execution of error correction code operations (including 0x43C and 0xA107) occur, and this type of abnormality had occurred at the corresponding location of the memory device where the abnormality occurs, the firmware cannot guarantee that such an abnormality will not occur, and it is not necessary to save the abnormality context information each time. Two abnormalities, including 0x43C and 0xA107, may be caused during garbage collection and host read, respectively.

In some examples, the method further comprises:
acquiring abnormality context information of the corresponding location of the memory device where the abnormality is caused to occur that is saved in the memory device before the abnormality occurred; and
determining whether the abnormality caused by the execution of the error correction code operation occurs for the first time at the corresponding location of the memory device where the abnormality is caused to occur, based on the abnormality context information of the corresponding location of the memory device where the abnormality is caused to occur that is saved in the memory device before the abnormality occurred.

It is understood that after the current abnormality occurs, the abnormality context information of an abnormality occurred previously at the corresponding location of the memory device where the abnormality is caused to occur that is saved in the memory device can be read, and it is determined whether such abnormality currently occurring has occurred previously at the corresponding location of the memory device, so as to determine whether such abnormality occurs for the first time at this location, and then determine whether to trigger the assertion processing mode.

In some examples, the method further comprises:
  after determining to trigger the assertion processing mode, sending a command to terminate running a program.

In the example of the present disclosure, after the assertion is triggered, the abnormal situation is further determined. When it is determined that the abnormality does not belong to the abnormality caused by the execution of the error correction code operation, or alternatively, when it is determined that the abnormality belongs to the abnormality caused by the execution of the error correction code operation and the abnormality caused by the execution of the error correction code operation occurs for the first time at the corresponding location of the memory device where the abnormality is caused to occur, it is determined to trigger the assertion processing mode, thereby avoiding triggering the assertion processing mode when the abnormality caused by the execution of the error correction code operation occurs repeatedly at the same location, and avoiding unnecessary termination of running the program and unnecessary saving of the abnormality context information in order to improve user testing efficiency.

An example of the present disclosure provides an operation method of a memory system, the method comprises: triggering an assertion when an abnormality occurs in a firmware of the memory system during operation; setting a flag to abort a hardware sequence command when release of the hardware sequence command is not completed within a preset time after the abnormality occurs in the firmware; and in response to the flag to abort the hardware sequence command, aborting the hardware sequence command such that the release of the hardware sequence command is completed. In the example of the present disclosure, when an abnormality occurs in the firmware during operation, the release state of the hardware sequence command is determined. If the release of the hardware sequence command is not completed within the preset time, it indicates that the firmware is stuck in a while loop and cannot be released automatically. By setting the flag to abort the hardware sequence command, the hardware sequence command is forcibly aborted, thereby forcibly releasing the hardware sequence command, so as to avoid the problem of failure to save the abnormality context information caused by the failure in release of the hardware sequence command.

Figure 8:
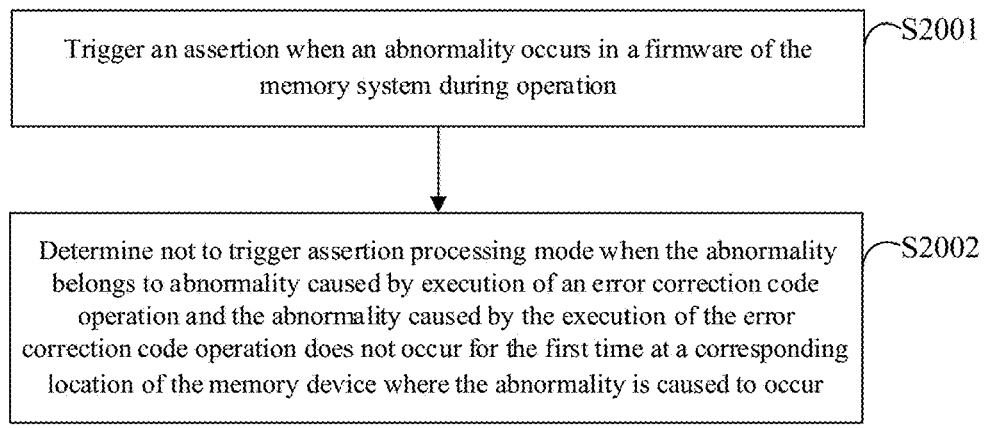
FIG. 8 is a schematic flowchart for implementing an operation method of a memory system according to another example of the present disclosure.

An example of the present disclosure provides another operation method of a memory system, and as shown in FIG. 8, the method comprises:
  Operation S2001: triggering an assertion when an abnormality occurs in a firmware of the memory system during operation; and
  Operation S2002: determining not to trigger an assertion processing mode when the abnormality belongs to abnormality caused by execution of an error correction code operation and the abnormality caused by the execution of the error correction code operation does not occur for the first time at a corresponding location of a memory device where the abnormality is caused to occur.

In some examples, the abnormalities occurring during firmware operation include a variety of situations. When some special abnormalities such as the abnormalities belong to the abnormalities that are caused by the execution of error correction code operations (including 0x43C and 0xA107) occur and these two abnormalities are detected by the memory system, the corresponding location of the memory device where such abnormality is caused to occur will be marked as a medium error, and the program proceeds. However, such abnormality at this location may continue to trigger an assertion processing mode, which causes the test to break in the middle. Furthermore, because such abnormality had occurred at the corresponding location of the memory device where the abnormality occurs, the firmware cannot guarantee that such an abnormality will not occur, and it is not necessary to save the abnormality context information each time. Two abnormalities, including 0x43C and 0xA107, may be caused during garbage collection and host read, respectively.

It is understood that, if the assertion processing mode is triggered, it will take a certain amount of time to terminate running the program and save the abnormality context information upon the triggering of the assertion processing mode, resulting in low user test efficiency. According to the examples of the present disclosure, the abnormal situation is further determined after the assertion is triggered. When the abnormality belongs to the abnormality caused by the execution of the error correction code operation and the abnormality caused by the execution of the error correction code operation does not occur for the first time at the corresponding location of the memory device where the abnormality is caused to occur, the assertion processing mode is not triggered, thereby avoiding unnecessary termination of running the program and unnecessary saving of the abnormality context information when the abnormality caused by the execution of the error correction code operation occurs repeatedly at the same location, in order to improve user testing efficiency.

Figure 9:
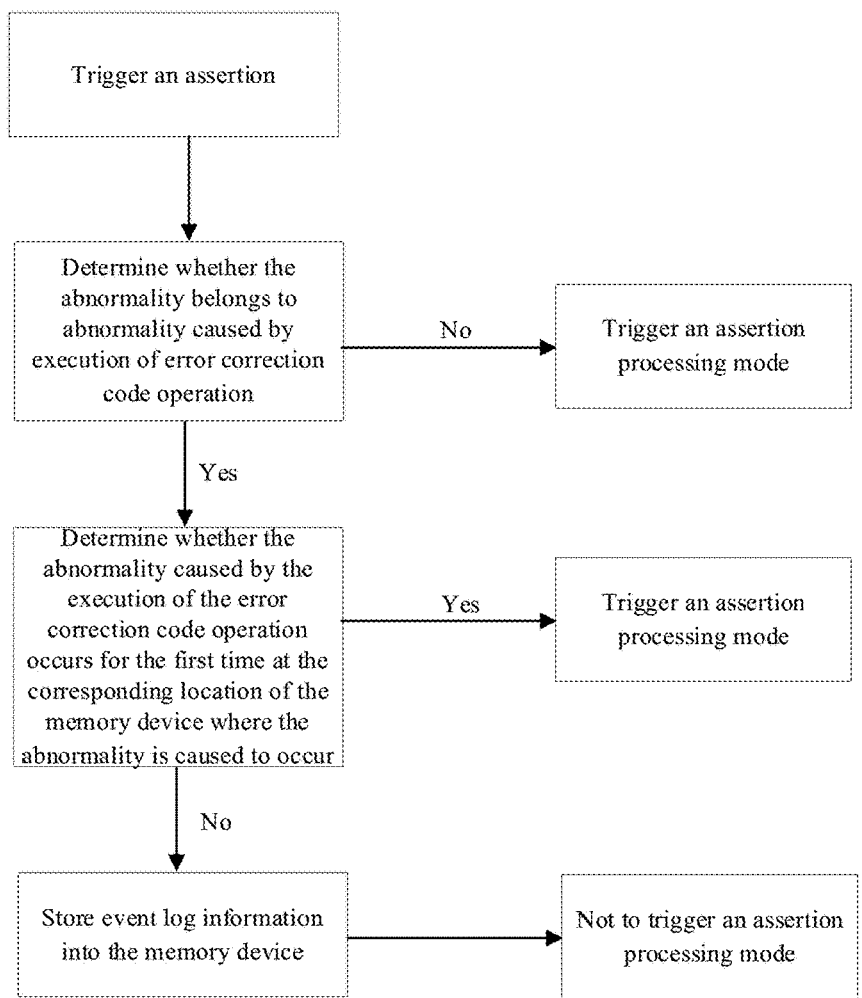
FIG. 9 is a schematic flowchart of a framework of an operation method of a memory system according to another example of the present disclosure.

The operation method of the memory system will be described in detail below with reference to FIGS. 8 and 9.

In some examples, the method further comprises:
  acquiring abnormality context information of the corresponding location of the memory device where the abnormality is caused to occur that is saved in the memory device before the abnormality occurred; and
  determining whether the abnormality caused by the execution of the error correction code operation does not occur for the first time at the corresponding location of the memory device where the abnormality is caused to occur, based on the abnormality context information of the corresponding location of the memory device where the abnormality is caused to occur that is saved in the memory device before the abnormality occurred.

It is understood that after the current abnormality occurs, the abnormality context information of an abnormality occurred previously at the corresponding location of the memory device where the abnormality is caused to occur that is saved in the memory device can be read, and it is determined whether such abnormality currently occurring has occurred previously at the corresponding location of the memory device, so as to determine whether such abnormality has occurred at this location, and then determine whether to trigger the assertion processing mode.

In some examples, the method further comprises:
  after determining not to trigger the assertion processing mode, sending a command to save event log information into the memory device.

Here, the event log information is just a simple recording of the abnormality. For example, the time when the abnormality occurs and the corresponding location of the memory device are recorded.

In some examples, the method further comprises:
  determining to trigger the assertion processing mode when the abnormality does not belong to the abnormality caused by the execution of the error correction code operation or when the abnormality belongs to the abnormality caused by the execution of the error correction code operation and the abnormality caused by the execution of the error correction code operation occurs for the first time at the corresponding location of the memory device where the abnormality is caused to occur.

In some examples, the method further comprises:
after determining to trigger the assertion processing mode, sending a command to terminate running a program.

It is understood that the firmware offered to the user does not trigger an assertion. If an assertion is triggered, it indicates that a more serious problem has occurred and will not go through the loop to continue running the program. However, the two abnormalities 0x43C and 0xA107 are special, which are caused by the irreversible UECC on the memory device. After the abnormal problem is processed later, the firmware cannot guarantee that such an abnormality will not occur again. Therefore, it is not necessary to record the abnormality context information of such abnormality repeatedly, and it is not necessary to terminate running the program, as terminating running the program and saving the abnormality context information both consume a lot of time, the test efficiency becomes low.

An example of the present disclosure provides an operation method of a memory system, the method including: triggering an assertion when an abnormality occurs in a firmware of the memory system during operation; and determining not to trigger an assertion processing mode when the abnormality belongs to abnormality caused by execution of an error correction code operation and the abnormality caused by the execution of the error correction code operation does not occur for the first time at a corresponding location of a memory device where the abnormality is caused to occur. According to the examples of the present disclosure, when an abnormality occurs in a firmware during operation, abnormal situations are further determined. When it is determined that the abnormality belongs to the abnormality caused by execution of an error correction code operation and the abnormality caused by the execution of the error correction code operation does not occur for the first time at a corresponding location of the memory device where the abnormality is caused to occur, the assertion processing mode is not triggered, which avoids unnecessary suspension of running the program and unnecessary saving of abnormality context information, thereby improving test efficiency and saving the capacity for saving of abnormality context information.

Based on the above operation method of the memory system, an example of the present disclosure further provides a memory system, the memory system comprises a memory device; and a memory controller coupled to the memory device; wherein the memory controller being configured to:
trigger an assertion when an abnormality occurs in a firmware of the memory system during operation;
set a flag to abort a hardware sequence command when release of the hardware sequence command is not completed within a preset time after the abnormality occurs in the firmware; and
in response to the flag to abort the hardware sequence command, abort the hardware sequence command such that the release of the hardware sequence command is completed.

In some examples, the memory controller is configured to:
not set the flag to abort the hardware sequence command when the release of the hardware sequence command is completed within the preset time.

In some examples, the preset time is longer than 2 s.

In some examples, the memory controller is configured to:
after the release of the hardware sequence command is completed, send a command to save abnormality context information into the memory device.

In some examples, the memory controller is configured to:
before sending the command to save the abnormality context information into the memory device, send a command to store the abnormality context information into a buffer of the memory controller; and
after the release of the hardware sequence command is completed, send a command to save the abnormality context information stored in the buffer of the memory controller into the memory device.

In some examples, the memory controller is configured to:
before sending the command to save the abnormality context information into the memory device, send a command to reset the memory device.

In some examples, the memory controller is configured to:
after the assertion is triggered, determine to trigger an assertion processing mode when it is determined that the abnormality does not belong to abnormality caused by execution of an error correction code operation.

In some examples, the memory controller is configured to:
after the assertion is triggered, determine to trigger an assertion processing mode when it is determined that the abnormality belongs to abnormality caused by execution of an error correction code operation and the abnormality caused by the execution of the error correction code operation occurs for the first time at a corresponding location of the memory device where the abnormality is caused to occur.

In some examples, the memory controller is configured to:
acquire abnormality context information of the corresponding location of the memory device where the abnormality is caused to occur that is saved in the memory device before the abnormality occurred; and
determine whether the abnormality caused by the execution of the error correction code operation occurs for the first time at the corresponding location of the memory device where the abnormality is caused to occur, based on the abnormality context information of the corresponding location of the memory device where the abnormality is caused to occur that is saved in the memory device before the abnormality occurred.

In some examples, the memory controller is configured to:
after determining to trigger the assertion processing mode, send a command to terminate running a program.

In some examples, the memory system includes a memory card or a solid state drive.

Based on the above operation method of the memory system, an example of the present disclosure further provides another memory system, the memory system comprises a memory device and a memory controller coupled to the memory device; wherein the memory controller being configured to:

trigger an assertion when an abnormality occurs in a firmware of the memory system during operation; and determine not to trigger an assertion processing mode when the abnormality belongs to abnormality caused by execution of an error correction code operation and the abnormality caused by the execution of the error correction code operation does not occur for the first time at a corresponding location of the memory device where the abnormality is caused to occur.

In some examples, the memory controller is configured to:

acquire abnormality context information of the corresponding location of the memory device where the abnormality is caused to occur that is saved in the memory device before the abnormality occurred; and determine whether the abnormality caused by the execution of the error correction code operation does not occur for the first time at the corresponding location of the memory device where the abnormality is caused to occur, based on the abnormality context information of the corresponding location of the memory device where the abnormality is caused to occur that is saved in the memory device before the abnormality occurred.

In some examples, the memory controller is configured to:

after determining not to trigger the assertion processing mode, send a command to save event log information into the memory device.

In some examples, the memory controller is configured to:

determine to trigger the assertion processing mode when the abnormality does not belong to the abnormality caused by the execution of the error correction code operation or when the abnormality belongs to the abnormality caused by the execution of the error correction code operation and the abnormality caused by the execution of the error correction code operation occurs for the first time at the corresponding location of the memory device where the abnormality is caused to occur.

In some examples, the memory controller is configured to:

after determining to trigger the assertion processing mode, send a command to terminate running a program.

For the structure and composition of the memory system herein, reference may be made to the detailed descriptions to FIG. 1, FIG. 2a, FIG. 2b, FIG. 3a, FIG. 3b, FIG. 4, and FIG. 5. For the sake of brevity, no more details are given here.

Based on the above-mentioned operation method of the memory system, an example of the present disclosure further provides a computer-readable storage medium having stored therein a computer program that, when executed by a processor, cause the processor to perform the operation method described in any of the above-mentioned examples.

All or part of the processes in the method of the above-mentioned examples herein can be implemented by instructing related hardware through a computer program. The program can be stored in a computer-readable storage medium. When the program is executed, the flow of the examples of the above-mentioned methods may be included. The storage medium may be a magnetic disk, an optical disk, a Read-Only Memory (ROM), a Random Access Memory (RAM), a Flash Memory, a Hard Disk Drive (HDD), a solid-state drive, and the like. The storage medium may further include a combination of the above-mentioned types of memory.

It should be understood that reference throughout the specification to "one example" or "an example" means that a particular feature, structure or characteristic related to the example is included in at least one example of the present disclosure. Thus, appearances of "in one example" or "in an example" in various places throughout the specification are not referring to the same example. Furthermore, these particular features, structures or characteristics may be combined in any suitable manner in one or more examples. It should be understood that in various examples of the present disclosure, the sequence numbers of the above-mentioned processes do not mean the order of execution, and the execution order of the processes should be determined by their functions and inherent logic, rather than limiting implementation process of the examples of the present disclosure. The sequence numbers of the above-mentioned examples of the present disclosure are for description only, and do not represent the advantages and disadvantages of the examples.

The methods disclosed in the several method examples provided in the present disclosure can be combined arbitrarily to obtain new method examples if there is no conflict.

The forgoing description is only a specific example of the present disclosure, but the protection scope of the present disclosure is not limited thereto. Anyone skilled in the art can easily conceive of changes or substitutions within the technical scope of the present disclosure, which should fall within the protection scope of the present disclosure. Therefore, the protection scope of the present disclosure should be determined by the protection scope of the claims.

What is claimed is:

1. A memory system, comprising:
   a memory device; and
   a memory controller coupled to the memory device; wherein the memory controller being configured to:
      trigger an assertion in response to that an abnormality occurs in a firmware of the memory system;
      set a flag to abort a hardware sequence command in response to that release of the hardware sequence command is not completed within a preset time after the abnormality occurs in the firmware; and
      in response to the flag to abort the hardware sequence command, abort the hardware sequence command.

2. The memory system of claim 1, wherein the memory controller is configured to:
   send a command to reset the memory device in response to that release of the hardware sequence command is completed within the preset time after the abnormality occurs in the firmware.

3. The memory system of claim 1, wherein the preset time is longer than 2 s.

4. The memory system of claim 1, wherein the aborting the hardware sequence command causes a completion of the release of the hardware sequence command, and wherein the memory controller is configured to:
   after the release of the hardware sequence command is completed, send a command to save abnormality context information into the memory device.

5. The memory system of claim 4, wherein the memory controller is configured to:
   before sending the command to save the abnormality context information into the memory device, send a command to store the abnormality context information into a buffer of the memory controller; and
   after the release of the hardware sequence command is completed, send a command to save the abnormality context information stored in the buffer of the memory controller into the memory device.

6. The memory system of claim 4, wherein the memory controller is configured to:
before sending the command to save the abnormality context information into the memory device, send a command to reset the memory device.

7. The memory system of claim 1, wherein the memory controller is configured to:
after the assertion is triggered, determine to trigger an assertion processing mode in response to a determination that the abnormality does not belong to abnormality caused by execution of an error correction code operation.

8. The memory system of claim 1, wherein the memory controller is configured to:
after the assertion is triggered, determine to trigger an assertion processing mode in response to a determination that the abnormality belongs to abnormality caused by execution of an error correction code operation, and wherein the abnormality caused by the execution of the error correction code operation occurs for a first time at a corresponding location of the memory device where the abnormality is caused to occur.

9. The memory system of claim 8, wherein the memory controller is configured to:
acquire abnormality context information of the corresponding location of the memory device where the abnormality is caused to occur, wherein the abnormality context information is saved in the memory device before the abnormality occurred; and
determine whether the abnormality caused by the execution of the error correction code operation occurs for the first time at the corresponding location of the memory device where the abnormality is caused to occur, based on the abnormality context information of the corresponding location of the memory device where the abnormality is caused to occur.

10. The memory system of claim 7, wherein the memory controller is configured to:
after determining to trigger the assertion processing mode, send a command to terminate running a program.

11. A memory system, comprising a memory device and a memory controller coupled to the memory device; wherein the memory controller being configured to:
trigger an assertion in response to that an abnormality occurs in a firmware of the memory system; and
determine not to trigger an assertion processing mode in response to that the abnormality belongs to abnormality caused by execution of an error correction code operation, and wherein the abnormality caused by the execution of the error correction code operation does not occur for a first time at a corresponding location of the memory device where the abnormality is caused to occur.

12. The memory system of claim 11, wherein the memory controller is configured to:
acquire abnormality context information of the corresponding location of the memory device where the abnormality is caused to occur, wherein the abnormality context information is saved in the memory device before the abnormality occurred; and
determine whether the abnormality caused by the execution of the error correction code operation does not occur for the first time at the corresponding location of the memory device where the abnormality is caused to occur, based on the abnormality context information of the corresponding location of the memory device where the abnormality is caused to occur.

13. The memory system of claim 11, wherein the memory controller is configured to:
after determining not to trigger the assertion processing mode, send a command to save event log information into the memory device.

14. The memory system of claim 11, wherein the memory controller is configured to:
determine to trigger the assertion processing mode in response to that the abnormality does not belong to the abnormality caused by the execution of the error correction code operation or in response to that the abnormality belongs to the abnormality caused by the execution of the error correction code operation and the abnormality caused by the execution of the error correction code operation occurs for a first time at the corresponding location of the memory device where the abnormality is caused to occur.

15. The memory system of claim 14, wherein the memory controller is configured to:
after determining to trigger the assertion processing mode, send a command to terminate running a program.

16. An operation method of a memory system, comprising:
triggering an assertion in response to that an abnormality occurs in a firmware of the memory system;
setting a flag to abort a hardware sequence command in response to that release of the hardware sequence command is not completed within a preset time after the abnormality occurs in the firmware; and
in response to the flag to abort the hardware sequence command, aborting the hardware sequence command.

17. The operation method of claim 16, wherein the method further comprises:
sending a command to reset the memory device in response to that release of the hardware sequence command is completed within the preset time after the abnormality occurs in the firmware.

18. The operation method of claim 16, wherein the preset time is longer than 2 s.

19. The operation method of claim 16, wherein the method further comprises:
after the release of the hardware sequence command is completed, sending a command to save abnormality context information into a memory device, wherein the aborting the hardware sequence command causes a completion of the release of the hardware sequence command.

20. The operation method of claim 19, wherein the method further comprises:
before sending the command to save the abnormality context information into the memory device, sending a command to store the abnormality context information into a buffer of a memory controller; and
after the release of the hardware sequence command is completed, sending a command to save the abnormality context information stored in the buffer of the memory controller into the memory device.

* * * * *